W. H. Bonnell.
Lantern.
Nº 75354 — Patented Mar. 10. 1868
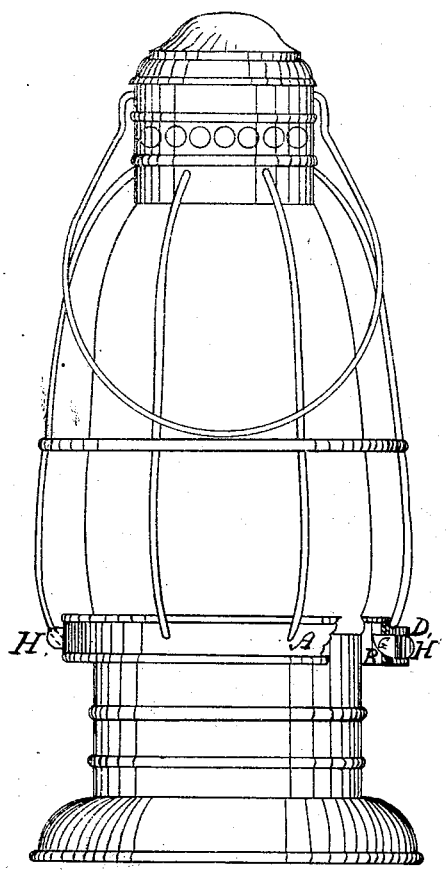
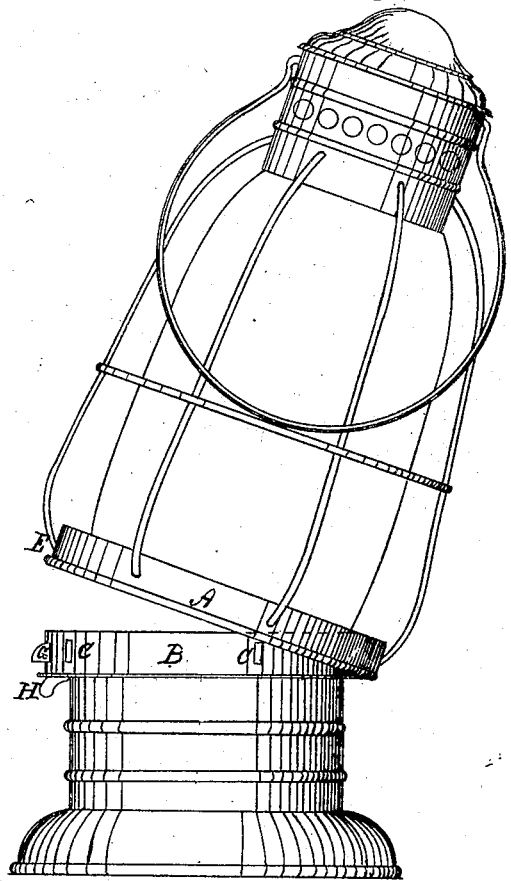
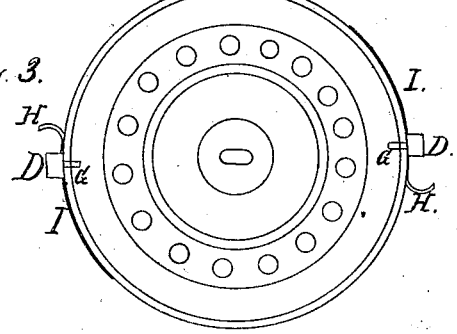
Witnesses.
Inventor.

United States Patent Office.

WILLIAM H. BONNELL, OF BUFFALO, NEW YORK.

Letters Patent No. 75,354, dated March 10, 1868.

---

IMPROVEMENT IN LANTERNS.

---

The Schedule referred to in these Letters Patent and making part of the same.

---

TO ALL WHOM IT MAY CONCERN:

Be it known that I, WILLIAM H. BONNELL, of Buffalo, in the county of Erie, and in the State of New York, have invented certain new and useful Improvements in Lanterns; and do hereby declare that the following is a full, clear, and exact description thereof, reference being had to the annexed drawings, making a part of this specification, in which—

Figure 1 is a side elevation, showing a part of the lower guard-rim broken out, so that the arrangement and working of the springs for connecting and holding the same to the lantern may be seen.

Figure 2 represents the lantern partly disengaged; and

Figure 3 is a plan view.

The object and nature of my invention consist in a new and useful combination and arrangement of the spring-attachment patented by Hugh Sangster, dated May 28, 1867, for the purpose of attaching the lamp-pot to the lantern.

By means of my arrangement, the lantern-glass or globe may be easily taken out or replaced at any time desired.

In the drawings, A represents the lower guard-rim, to which the springs are fastened. B, an inner rim, which is a narrow rim surrounding the lower rim of the lantern. It is so made that the rim A may be easily slipped over it. C C represent the apertures, of which there may be two or more, through which the springs pass when the two rims are fastened together. D represents a strap, which protects the spring, and prevents it from being pulled too far out while disengaging the guards to take out the globe. In fig. 2, I have shown a similar spring; but, instead of being placed on the rim A, it is fastened on the inside of the rim B, and, in fastening the rims A and B together, the catch part of the spring or springs is made to pass through openings in the rim A similar to E in fig. 2. I I represent the two springs. In figs. 1 and 2, G represents the catch part of the spring, of which there are two; H, the thumb-piece, by which the springs are operated.

The guards and upper part of the lantern are attached or detached by pulling or pressing on the thumb-piece H of one of the springs, and moving the lantern into the position shown in fig. 2, in which position the other spring is disengaged, or partly so, and the upper part of lantern and guards may be taken off.

The attachment of the guards and globe or glass is done by simply pressing them down over the springs, and then turning them around until the catches pass through the apertures C C.

As the springs I I are made similar to those described in the patent to Hugh Sangster, above referred to, I lay no claim to them alone; but What I do claim as my invention, and desire to secure by Letters Patent, is—

The combination and arrangement of the springs I I with the rims A or B and openings C C, as and for the purposes described.

W. H. BONNELL.

Witnesses:
JAMES SANGSTER,
AMOS W. SANGSTER.